United States Patent
Gerber

(10) Patent No.: US 7,140,616 B1
(45) Date of Patent: Nov. 28, 2006

(54) SEALING DEVICE

(75) Inventor: Ernst Gerber, Reigoldswil (CH)

(73) Assignee: Rego-Fix AG, Tenniken (CH)

(*) Notice: Subject to any disclaimer, the term of this patent is extended or adjusted under 35 U.S.C. 154(b) by 0 days.

(21) Appl. No.: 10/089,869

(22) PCT Filed: Oct. 26, 2000

(86) PCT No.: PCT/CH00/00572

§ 371 (c)(1),
(2), (4) Date: Jul. 8, 2002

(87) PCT Pub. No.: WO01/34331

PCT Pub. Date: May 17, 2001

(30) Foreign Application Priority Data

Nov. 9, 1999 (CH) .................................. 2051/99

(51) Int. Cl.
F16J 15/46 (2006.01)
F16J 15/16 (2006.01)
F16J 15/54 (2006.01)
B23D 77/00 (2006.01)

(52) U.S. Cl. .................. 277/500; 277/910; 277/579; 277/584; 408/197

(58) Field of Classification Search ............... 277/500, 277/910, 602, 604, 628, 630, 579, 584; 408/197
See application file for complete search history.

(56) References Cited

U.S. PATENT DOCUMENTS

| 3,080,170 | A | * | 3/1963 | Cobly | 277/390 |
| 4,166,606 | A | * | 9/1979 | Kawolics et al. | 251/214 |
| 4,418,924 | A | * | 12/1983 | Mack | 277/448 |
| 4,577,870 | A | * | 3/1986 | Scott et al. | 277/311 |
| 5,340,127 | A | | 8/1994 | Martin | |
| 5,617,879 | A | * | 4/1997 | Kubala | 285/95 |
| 5,669,636 | A | * | 9/1997 | Kubala | 285/98 |

FOREIGN PATENT DOCUMENTS

| CH | 684938 A5 | 2/1995 |
| DE | 298 13 998 U1 | 11/1998 |
| DE | 198 32 793 A1 | 3/1999 |

* cited by examiner

Primary Examiner—Vishal Patel
(74) Attorney, Agent, or Firm—Hoffmann & Baron, LLP

(57) ABSTRACT

The invention relates to a sealing device which is provided with an annular circumferential groove in a preceding sealing washer and having a sealing body disposed in the groove. The width and depth of the groove are larger than the cross-section of the sealing body so that the sealing body can be axially moved in the groove and may be forced against the wall of the groove and the tool shank by inner pressure provided, for example, by a coolant.

2 Claims, 3 Drawing Sheets

US 7,140,616 B1

SEALING DEVICE

This application is the national stage filing of PCT No. PCT/CH00/00572 filed on Oct. 26, 2000 claiming priority to Application No. CH 2051/99 filed on Nov. 9, 1999.

FIELD OF THE INVENTION

The present invention relates to a sealing device for the external sealing of a collet chuck housing of a machining tool having a collet chuck preceded by a sealing washer. More particularly, the present invention relates to a novel sealing device for external sealing of a collet chuck housing wherein the sealing device includes an annular circumferential groove with an elastic sealing body disposed therein.

BACKGROUND OF THE INVENTION

It is known to provide a tensioning nut with a sealing washer which outwardly locks the front side of the tensioning nut (i.e. the side facing away from the machine) for the purpose of providing a liquid tight seal. Conventional cylindrical surfaces of the opening facing towards the tool shank, include sealing washers having an annular groove in which an O-ring is disposed. The dimensions of the O-ring are such that it sits elastically against the tool shank thus closing the annular gap between the shank and the sealing washer. The seal is substantially provided by the elasticity of the O-ring.

When coolant internal pressures become elevated, the seal is not always assured. This is especially true when the elasticity and the surface of the O-ring have been degraded by prolonged use.

SUMMARY OF THE INVENTION

It is an object of the present invention to provide a sealing device having an improved resistance to higher internal pressures.

This object is achieved according to the invention by making the width and depth of the groove provided in the surface of the sealing washer facing towards the tool shank larger than the diameter of the elastic sealing body so that the latter can move axially in the groove. The sealing body is preferably an O-ring.

A sealing device for external sealing of a collet chuck housing is provided for a machining tool having a collet chuck housing and collet chuck operatively arranged about a tool shank. The sealing device includes a sealing washer operatively arranged between the tool shank and collet chuck and having an annular groove circumferentially in communication with the tool shank; and an elastic sealing body disposed in the groove, wherein substantially all of a width and substantially all of a depth of the groove are greater in size than a cross section of the elastic sealing body such that the sealing body is axially moveable in the groove.

DETAILED DESCRIPTION OF THE PREFERRED EMBODIMENTS

With the foregoing and additional features in mind, this invention will now be described in more detail, and other benefits and advantages thereof will be apparent from the following detailed description when taken in conjunction with the accompanying drawings in which identical numbers identify like elements throughout the several views.

Figure 1:
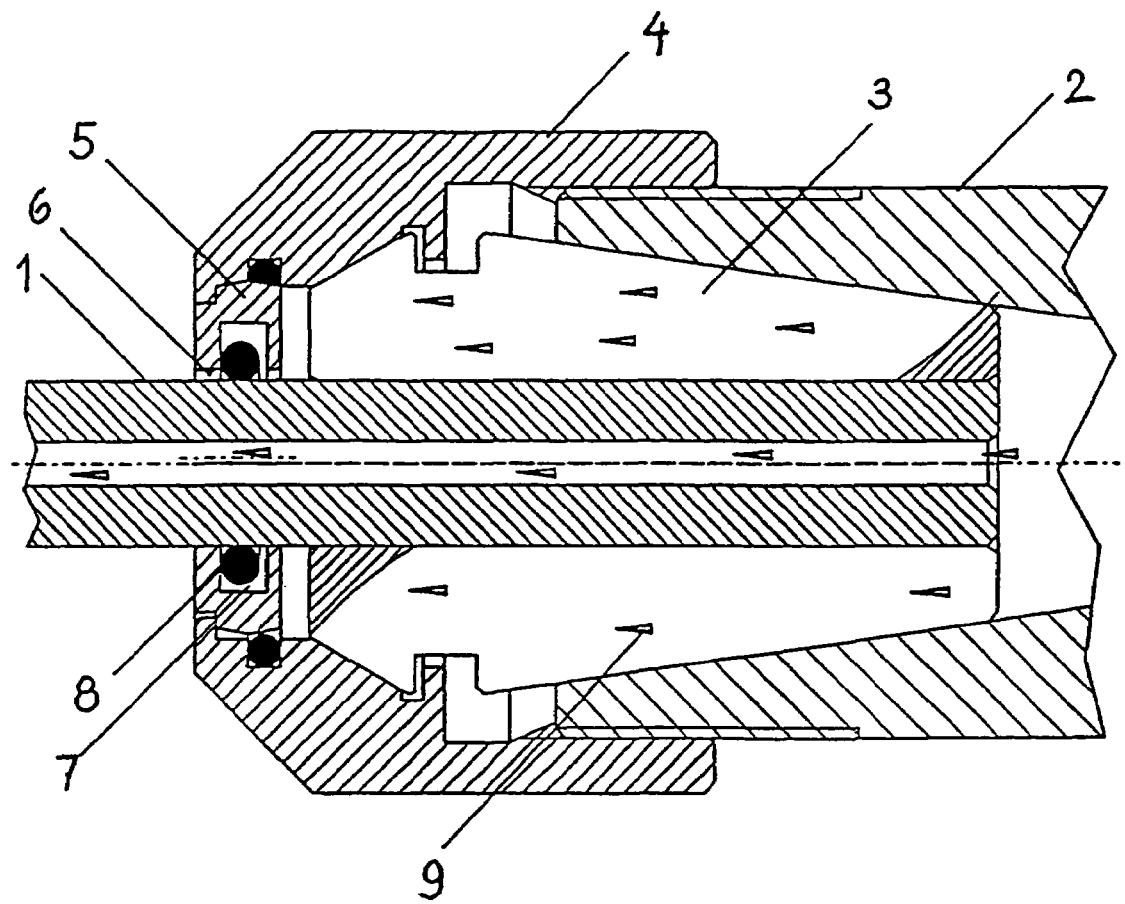
FIG. 1 is a sectional view of a clamping device with a tensioning nut and sealing washer.

The clamping device for a tool shank 1 shown in FIG. 1 consists of a collet chuck housing 2, an inserted collet chuck 3, and a tensioning nut 4. A sealing washer 5 is located on the face of the tensioning nut 4, which has been inserted from the back (i.e. from the machine side). The sealing washer 5 has an opening for the tool shank 1, a cylindrical surface 6 facing towards the tool shank 1, and an annular circumferential groove 7. A seal or sealing body, in this case an O-ring 8, is disposed within the groove 7. The arrows indicate the direction of flow of the coolant in the slots of the collet chuck 3 and in the bore of the tool shank 1.

In contrast to the conventional grooves for O-rings, the groove 7 in the present invention is both wider and deeper than a cross section of the O-ring 8 so that the latter is axially displaceable in the groove 7. This can be seen in FIG. 2*a*, where the O-ring 8 is located axially in the middle of the groove 7, in which position it would have no sealing function per se.

Figure 2:
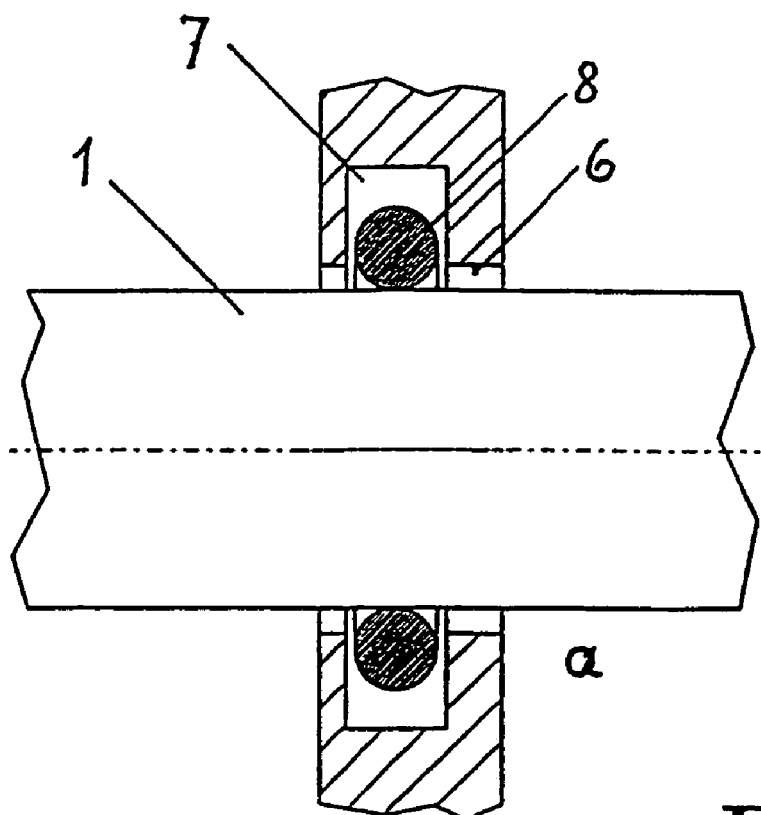
FIGS. 2*a* and 2*b* show an enlarged detailed sectional view of the opening of the sealing washer.
Figure 2:
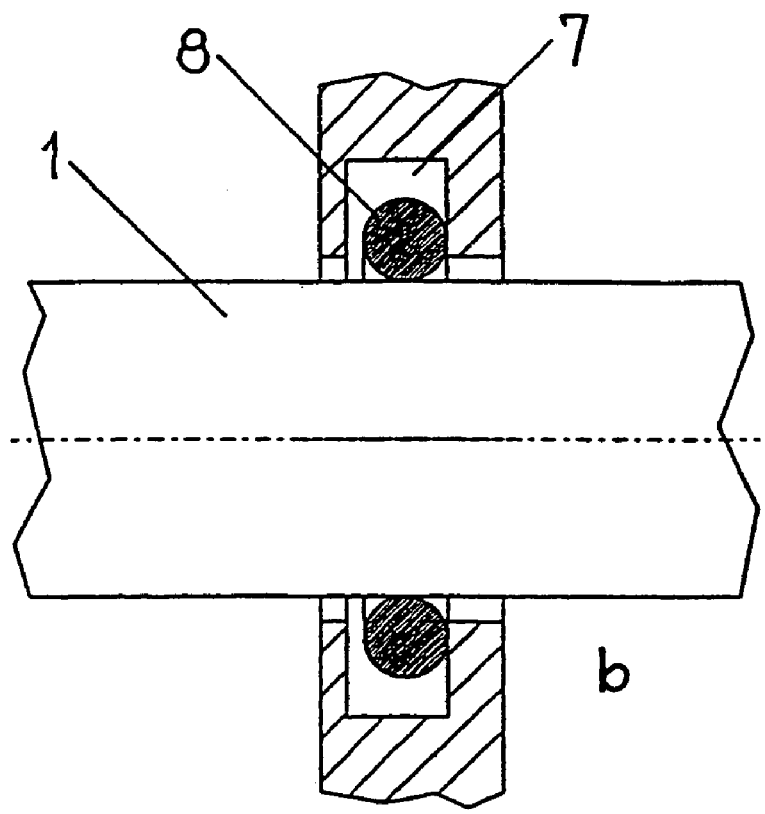
Figure 3:
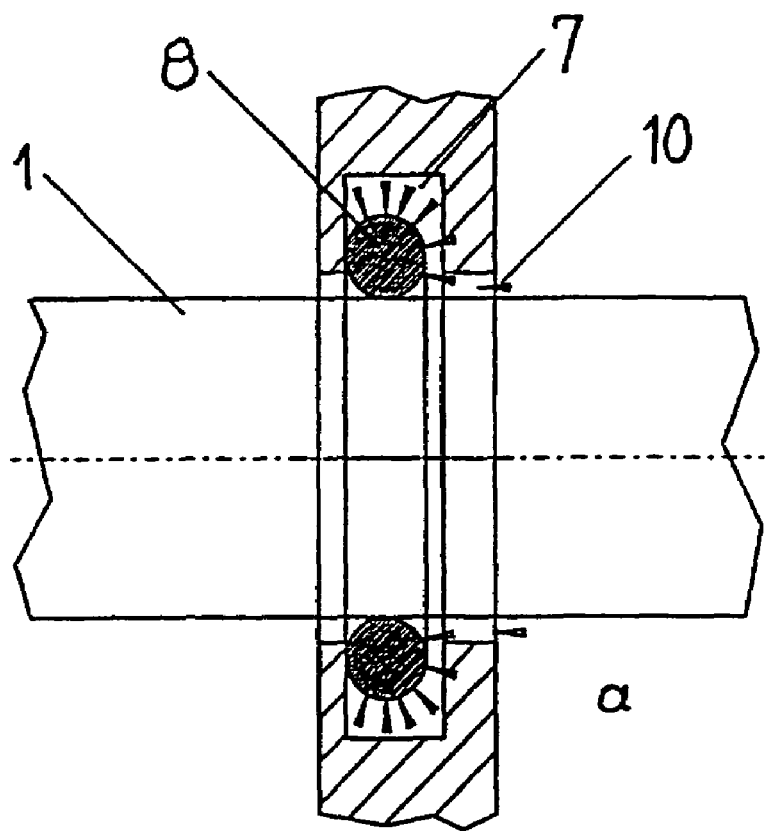
FIGS. 3*a* and 3*b* show FIGS. 2*a* and 2*b* when the sealing washer is compressed.
Figure 3:
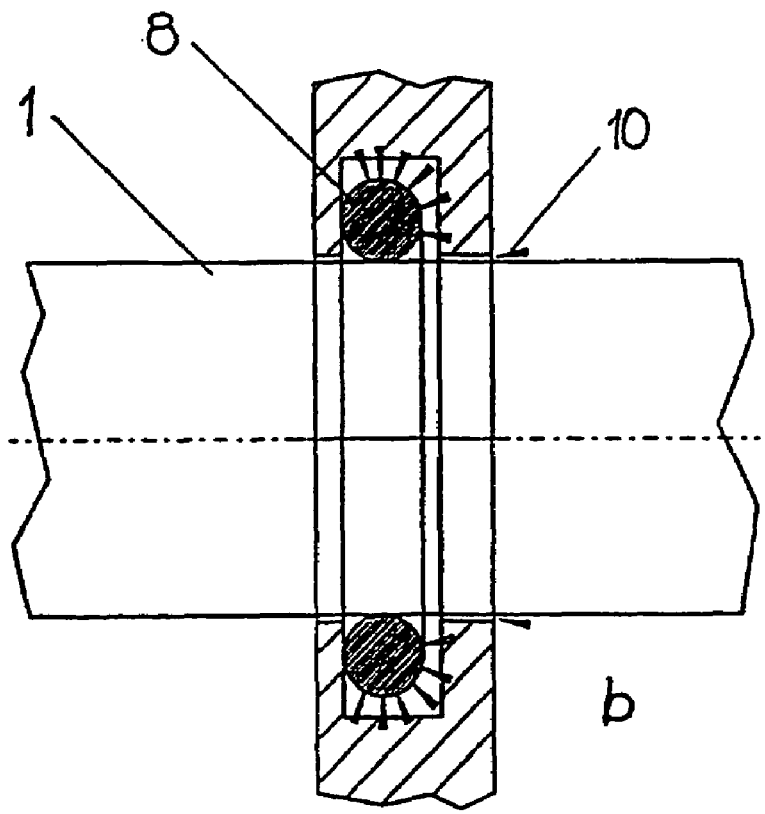

Referring now to FIG. 2*b*, the O-ring 8 is axially displaced and sits against a side wall of the groove 7. In this position, the opening is sealed, especially when the O-ring 8 is compressed, for example, by the coolant pressure against the side wall of the groove 7 and also simultaneously against the tool shank 1. Compression of the O-ring 8 by the coolant pressure is shown in FIG. 3*a* and FIG. 3*b*, where arrows 10 indicate the direction of internal pressure. FIG. 3*a* shows a situation in which a tool shank 1 of smaller diameter is inserted. In FIG. 3*b*, a tool shank 1 of larger diameter is inserted, with the gap between the shank and the opening of the sealing washer 5 being narrower. The ability of the seal to adapt to tool shanks having different thicknesses is better assured with the design of the present invention as opposed to the conventional design.

In the design according to the present invention, it is also possible for the collet chuck rather than the tensioning nut to be provided with a sealing washer. The design according to the present invention is equally suitable for this type of sealing washer.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention, and it is intended to claim all such changes and modifications to fall within the scope of the invention.

What is claimed is:

1. A sealing washer for sealing a rotating collet chuck arrangement of a machine tool against coolant leakage, the washer having a circular opening for the tool shank, this opening defining a cylindrical surface with an annular groove in it and being dimensioned such that an open annular gap exists between the cylindrical surface and the tool shaft through which open space coolant can flow into said groove and build up pressure therein, an elastic sealing body disposed in the groove and embracing the tool shaft, wherein the groove is wider and deeper over its entire axial length than the cross-section of the elastic sealing body such that the sealing body is pressed by coolant against a side wall of the groove.

2. A sealing washer according to claim 1, wherein the washer is attached to a tensioning nut of a collet chuck arrangement.

* * * * *